United States Patent
Herzog

(10) Patent No.: US 10,722,985 B2
(45) Date of Patent: Jul. 28, 2020

(54) METHOD FOR ASSESSING THE STRUCTURAL QUALITY OF THREE-DIMENSIONAL COMPONENTS

(71) Applicant: CL Schutzrechtsverwaltungs GmbH, Lichtenfels (DE)

(72) Inventor: Frank Herzog, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 1208 days.

(21) Appl. No.: 14/764,497

(22) PCT Filed: Jan. 29, 2014

(86) PCT No.: PCT/DE2014/000036
§ 371 (c)(1),
(2) Date: Jul. 29, 2015

(87) PCT Pub. No.: WO2014/135137
PCT Pub. Date: Sep. 12, 2014

(65) Prior Publication Data
US 2015/0367453 A1    Dec. 24, 2015

(30) Foreign Application Priority Data
Mar. 8, 2013 (DE) .......................... 10 2013 003 937

(51) Int. Cl.
*B33Y 40/00* (2020.01)
*B23K 31/12* (2006.01)
(Continued)

(52) U.S. Cl.
CPC .......... *B23K 31/125* (2013.01); *B22F 3/1055* (2013.01); *B23K 26/34* (2013.01);
(Continued)

(58) Field of Classification Search
CPC ....................................................... B33Y 40/00
See application file for complete search history.

(56) References Cited

U.S. PATENT DOCUMENTS

2013/0168902 A1*  7/2013  Herzog ................. B22F 3/1055
                                                          264/401
2013/0343947 A1   12/2013  Satzger et al.

FOREIGN PATENT DOCUMENTS

DE   202010010771 U1   11/2011
DE   102011009624 A1    8/2012
WO   WO2012019577     *  5/2011

OTHER PUBLICATIONS

Murr. Characterization of titanium aluminide alloy components fabricated by additive manufacturing using electron beam melting. Acta Materialia vol. 58, Issue 5, Mar. 2010, pp. 1887-1894 (Year: 2009).*

(Continued)

*Primary Examiner* — Matthew E. Hoban
(74) *Attorney, Agent, or Firm* — Dority & Manning, P.A.

(57) ABSTRACT

A method for assessing the structural quality of three-dimensional components which are produced by laser sintering or laser melting. The component is produced by the successive solidification of individual layers of a construction material solidified by the action of radiation, by sintering or fusing the construction material. The fusion region is captured by a sensor device and sensor values for evaluating the quality of the component are derived therefrom. The sensor values with the co-ordinate values which localize the sensor values in the component are stored with a division of the calculated sensor values into values which are critical to the structural quality of the component and non-critical values to said quality and with a representation of those (Continued)

Figure 1:
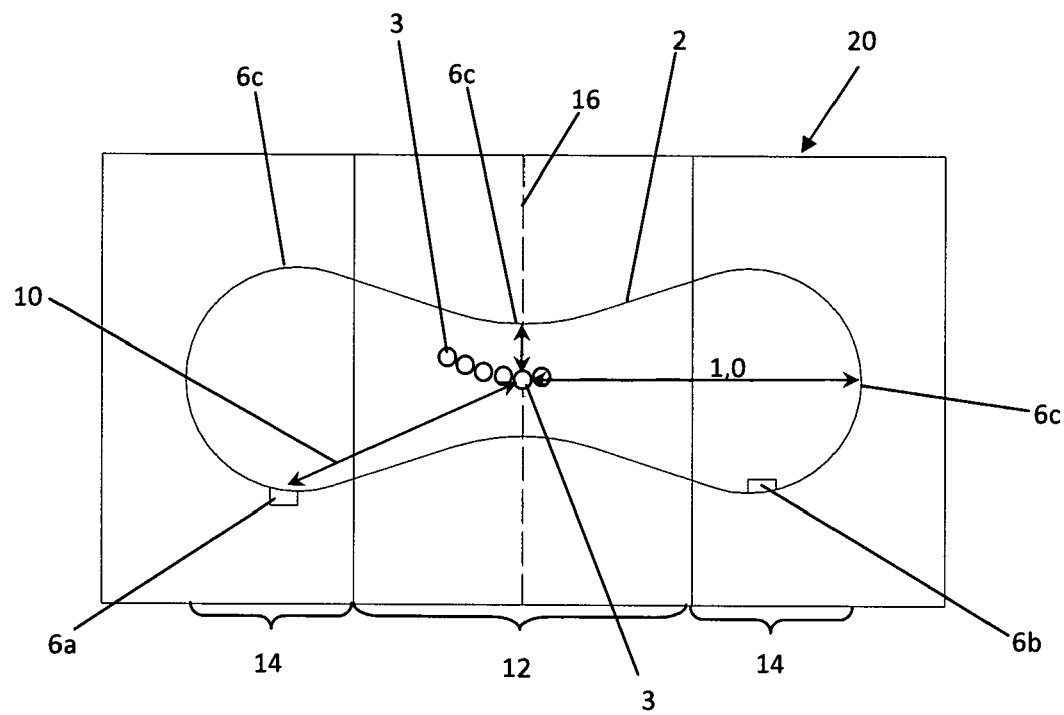

values critical to the structural quality of the component as to their distance from a reference point lying or arranged in the region of the surface.

19 Claims, 1 Drawing Sheet

(51) Int. Cl.
*B22F 3/105* (2006.01)
*B23K 26/34* (2014.01)
*B23K 26/342* (2014.01)
*B33Y 50/00* (2015.01)

(52) U.S. Cl.
CPC ............ *B23K 26/342* (2015.10); *B23K 31/12* (2013.01); *B33Y 40/00* (2014.12); *B22F 2003/1056* (2013.01); *B33Y 50/00* (2014.12); *Y02P 10/295* (2015.11)

(56) References Cited

OTHER PUBLICATIONS

International Search Report Corresponding to Application No. PCT/DE2014/000036 dated Aug. 14, 2014.
European Search Report Corresponding to Application No. 18215619 dated Apr. 23, 2019.

* cited by examiner

METHOD FOR ASSESSING THE STRUCTURAL QUALITY OF THREE-DIMENSIONAL COMPONENTS

CROSS-REFERENCE TO RELATED APPLICATIONS

This application is a United States national stage entry of an International Application serial no. PCT/DE2014/000036 filed Sep. 12, 2014 which claims priority to German Patent Application Ser. No. 10 2013 003 937.1 filed Mar. 8, 2013. The contents of these applications are incorporated herein by reference in their entirety as if set forth verbatim.

The invention concerns a method for assessing the structural quality of three-dimensional components, which are produced by a laser sintering or laser melting process. In laser sintering or laser melting processes, components are solidified by sequential solidification of individual layers of a construction material by means of sintering or fusing. The melt area produced by a punctiform or linear application of energy is recorded by a sensor device. Sensor values for evaluating the component quality are derived from this and the sensor values are stored, together with the coordinates locating the sensor values in the component.

A method of this type emerges from DE 20 2010 010 771.7. With the prior art, it is already possible to determine, based on the sensor values, whether imperfections critical to the structure, i.e. affecting the quality, in particular, the strength of the component, have formed in the component during the construction process, in which e.g. the construction material has not been solidified in the manner foreseen or other imperfections have formed due to the construction process.

The problem underlying the invention is to develop a process with the characteristics of Patent Claim 1 so that continuing investigations such as breaking tests and component sectioning can be performed on completion of the component produced with reduced outlay on the same. This problem is solved by the characteristic features of Claim 1. Advantageous developments arise from the subclaims.

The core of the of the process is viewed as, firstly, dividing the sensor values determined essentially into sensor values, which appear to be critical to the structural quality of the component and those, which are classified as noncritical. The critical sensor values can then be represented with reference to their distance from a point of reference placed or arranged within the area of the surface of the component. In other words, it is possible to represent critical sensor values e.g. with reference to their distance from a base surface of the component or from a selected lateral surface. The operator then knows exactly the depth, with reference to the selected lateral surface, at which a fault is to be expected and then has the option of carrying out e.g. breaking tests at the corresponding position on the component or of slicing the component by means of a diamond saw and of investigating, by way of "reverse engineering", the effects of faults in the construction process on the component, in particular, on its structural quality and hence on the strength of the component. The exact localization with reference to their distance from an external area of the component enables the component e.g. to be clamped and then, at precisely the appropriate location, to be sawed open, drilled out or for other tests to be carried out in order to investigate the interior of the component classified as critical.

Defined points on the outer surface of the finished component, an edge of the component or e.g. a clamping recess or a clamping lug on the finished component lend themselves as reference points, which can serve in a critical fashion for the display in reference to the distance for the structural quality of the component. Clamping recesses or clamping lugs on components are used to insert these into a processing machine following the construction process, with the aid of the clamping system and to position these precisely using the clamping system. If the precise distance or the precise internal position of faults in the component with reference to the clamping point is known, then, e.g. using a processing machine, a precise investigation of the finished component can take place, e.g. using a machining technique or using nondestructive investigation techniques.

If the intention is to measure between the selected reference point, e.g. the clamping point, and a displayed sensor value evaluated as structurally critical, which can display a fault in the component, then examination equipment such as a cutting device, a drilling device, a breaking device, with which the component is to be tested for a fracture at a particular point, and so on, can be brought particularly precisely into contact with the component to be examined.

To speed up the process and to simplify a representation, it is advantageous if the component is divided into load-critical and load-noncritical areas beforehand and only sensor values classified as structurally critical are displayed in load-critical areas of the component. Hence, the 3-D representation to be realized on the model of a "computer tomogram" can be simplified and made distinctly clearer. Load-noncritical areas of the component are not provided with sensor value displays and hence remain transparent, so that the load-critical components can be better inspected. In some circumstances, however, it is advantageous to provide particularly structurally critical sensor values, i.e. sensor values which could also identify load-noncritical components as rejects, with displayed sensor values.

In the design of a component, due to the predetermined design, potential yield lines in load-critical components can be defined at the outset. If these appear in the vicinity of yield lines defined beforehand as sensor values assessed as structurally critical, then caution is required. For this reason, defining yield lines, in some circumstances, in fact, indicating these in the display and representing sensor values assessed with reference to potential yield lines as structurally critical, is beneficial. Here, the distance measured between the structurally critical sensor values and potential yield lines can also be shown in order to give the observer precise information as to the distance of the sensor values assessed as structurally critical from potential yield lines. It is also possible to display a number of sensor values in close proximity to one another and to be categorized as structurally critical as a sensor value cluster. If, e.g. a sensor value cluster with structurally critical production values extends near a yield line or even across this, then it should be assumed that the component will fracture under load in the area of the yield line. An existing high fracture risk can then be indicated on a display without subjecting the component to a breaking test.

The risk of fracture can be shown in fracture risk stages, wherein a classification into fracture risk stages is made as a function of the number of critical sensor values, the severity of the structural damage expected on the basis of the sensor values, with reference to individual sensor values or sensor value clusters and their distance from a potential yield line.

Claims 12-14 describe measures, which result in a destructive examination of the component and give an indication of the type of structural damage, which can be displayed by the sensor values and what consequences this structural damage will have on the component in terms of its stability.

Figure 2:
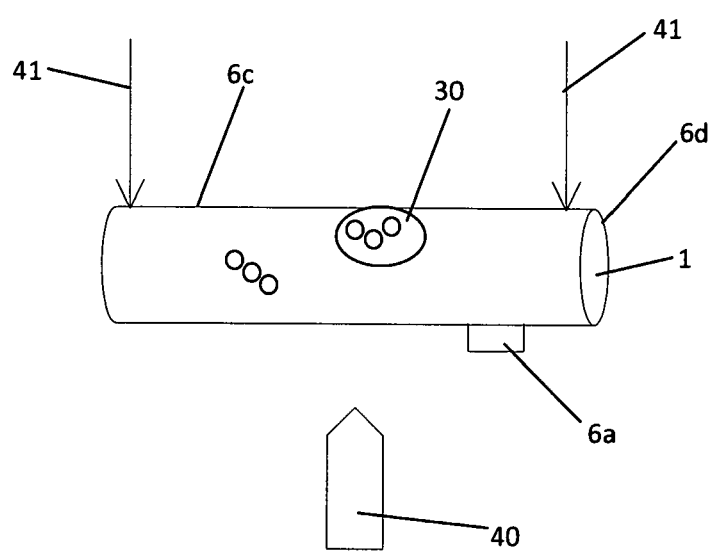

The invention is outlined in more detail with the aid of advantageous exemplary embodiments. These depict:

FIG. 1 a schematic two-dimensional representation of a, e.g. bone-shaped, i.e. centrally narrow, component with critical sensor values represented in accordance with the method;

FIG. 2 a schematic 3-D representation of a rod-shaped component with displayed sensor values.

Using the method, components are manufactured by a laser sintering or laser melting process. In FIG. 1, a bone-shaped component 1 with a neck 2 in the central area of the component 1 is displayed two-dimensionally, i.e. as a component layer. The component is stabilized by stabilizing individual layers by exposure to an emission by sintering or fusing a powdered construction material. The melt area, which develops due to the application of energy, is recorded by a sensor device and sensor values for evaluating a component quality are derived from this. The sensor values can be displayed two- or multi-dimensionally, with reference to their recording location in the component 1, e.g. by pinpoint imaging of component faults 3.

The sensor values are stored together with the coordinate values localizing the sensor values in the component 1.

According to the invention, the sensor values ascertained are initially divided into values critical and noncritical for the structural quality of the component 1. This means that e.g. depending on the size of a fault, of a temperature deviation in the construction process, of powder imperfections in the coating and so on, the sensor values are divided into critical and noncritical and at least the values critical for the structural quality of the component 1 are displayed with reference to the distance from a reference point located or arranged in the area of the surface 5 of the component. A clamping lug 6a, a clamping recess 6b or an arbitrary point 6c on the surface 5 of the component, for example, can be used as the reference point 6. In this connection, it is significant that where and, in particular, the depth at which the critical values 3 are disposed in the component, can be determined starting from the surface 5 of the component after the completion of the component 1.

Advantageously, the critical sensor values are visualized by means of a visualization device, whereby a measurement 10 using dimension arrows is helpful in order to trace the critical value on the inside of the component, starting from a selected reference point 6.

Starting from the design conditions, a component 1 can be divided into load-critical areas 12 and load-noncritical areas 14 and only the sensor values 3 rated as structurally critical in the load-critical component areas 12 can be displayed. Advantageously, however, sensor values assessed as particularly structurally critical, i.e. faults, which are to be classified as particularly critical in respect of the component quality, should be displayed in all areas of the component 12, 14.

In accordance with the method, potential yield lines 16 in load-critical component areas 12 can be defined due to predetermined design conditions and the sensor values assessed as structurally critical can be displayed with reference to a potential yield line 16. If one or more critical sensor values 3 seem likely near or actually on a yield line 16, then there is a relatively high probability of a fracture of the component 1, which can be indicated on a display device of a visualization device 20, e.g. in the form of a monitor. Displaying a number of structurally critical sensor values, which are close together, as sensor value clusters 30 is also advantageous because, due to the structural interaction, critical sensor values in close proximity to each other are naturally particularly critical for the component quality.

The risk of fracture can be shown on the visualization device 20 in fracture risk stages, wherein a classification into fracture risk stages is made as a function of the number of critical sensor values, the severity of the structural damage expected on the basis of the sensor values, based on individual sensor values or sensor value clusters or their distance from a potential yield line 16.

FIG. 2 also depicts how a finished component 1 in the form of a rod with a number of critical sensor values 3 or sensor value clusters 30 is submitted to a breaking load test. For this purpose, the component 1 is positioned on a cutting blade 40 with the aid of the selected reference pointes 6a, 6c or 6d and is pressed onto the cutting blade 40 by exerting an opposing force 41. Breaking tests of this type serve in practice to examine the effects of structural damage in the form of critical sensor values 3 or of sensor value clusters 30 on the breaking characteristics of the component 1.

In principle, the manufacturing process can also be directly influenced with the aid of the method and/or an operator can at least be informed concerning critical values, which are relevant to the structural quality of the component, emerging during the current manufacturing process. If, for example, it is determined by the device that a number of faults have arisen, as indicated by critical sensor values, in a component area viewed as load-critical, then a visual or acoustic alarm can be set off in order to give the operator an appropriate notification. Where necessary, however, the exposure device of the appliance can also be set up to reexpose or to reirradiate critical "underexposed" points of the component and, in this way, to complete the required melting process if inadequate irradiation of the component in the respective area has been identified. This also applies to a recoating process when it is determined that the powder coating is incomplete in a particular location. In this case, it is possible to recoat component areas with too little construction material again and then to fuse this particular area in order to remedy imperfections.

LIST OF REFERENCE SIGNS

1 Component
2 Neck
3 Sensor value
5 Surface of 1
6a Clamping lug
6b Clamping recess
6c Arbitrary point
10 Measurement
12 Load-critical area
14 Load-noncritical area
16 Yield line
20 Visualization device
30 Sensor value cluster
40 Cutting blade
41 Opposing force

What is claimed is:

1. A method of assessing a structural quality of a three-dimensional component produced by sintering or fusing a powdered construction material using an additive manufacturing process, the method comprising:

localizing a sensor value to coordinate values of an internal location within a three-dimensional component in relation to a reference point of the component, the sensor value indicating a structural quality of the component; and outputting instructions configured for guiding an article of examination equipment to move in proximity to an investigation location on a surface of the component in relation to the reference point, the investigation location corresponding to the coordinate values of the internal location within the component to which the sensor value has been localized.

2. The method of claim 1, wherein the sensor value comprises or is based at least in part on information from a sensor device configured to monitor a melt area created by a punctiform or linear application of energy for sintering or fusing the powdered construction material.

3. The method of claim 1, comprising:
classifying the sensor value as being a critical sensor value based at least in part on the sensor value being indicative of a structural fault, a temperature deviation when sintering or fusing a powdered construction material, and/or an imperfection in a coating of powdered construction material to be sintered or fused.

4. The method of claim 1, comprising:
classifying the sensor value as being a critical sensor value based at least in part on the sensor value corresponding to a load-critical area of the component.

5. The method of claim 1, comprising:
providing for display on a visualization device, a representation comprising the sensor value localized to coordinate values of the internal location within the three-dimensional component in relation to the reference point of the component, the representation comprising a two-dimensional or multi-dimensional representation of the component, wherein the representation is configured for guiding the article of examination equipment to move in proximity to the investigation location on the surface of the component in relation to the reference point.

6. The method of claim 5, wherein representation comprises an indication of a distance between the reference point of the component and the coordinate values corresponding to the sensor value.

7. The method of claim 6, wherein the indication of the distance between the reference point of the component and the coordinate values corresponding to the sensor value comprises a representation of a measured distance line.

8. The method of claim 5, wherein the representation comprises a potential yield lines and the sensor value displayed with reference to the potential yield line.

9. The method of claim 1, wherein the reference point of the component comprises a defined point corresponding to a clamping lug or a clamping recess of the component.

10. The method of claim 1, wherein the article of examination equipment comprises a cutting device, a drilling device, or a breaking device, the examination equipment configured to prepare at least a portion of the component to be tested for a fracture.

11. The method of claim 1, comprising:
localizing a sensor value comprises localizing a plurality of sensor values to respective coordinate values of an internal location within the three-dimensional component in relation to the reference point of the component, the plurality of sensor values indicating a structural quality of the component corresponding to the respective coordinate values; and
outputting instructions configured for guiding an article of examination equipment to move in proximity to an investigation location on a surface of the component in relation to the reference point, the investigation location corresponding to the coordinate values of the internal location within the component to which a one or more sensor values selected from among the plurality of sensor values has been localized.

12. The method of claim 11, comprising:
providing for display on the visualization device, a representation comprising the plurality of sensor value localized to respective coordinate values of the internal location within the three-dimensional component in relation to the reference point of the component, the representation comprising a two-dimensional or multi-dimensional representation of the component, wherein the representation is configured for guiding the article of examination equipment to move in proximity to the investigation location on the surface of the component in relation to the reference point.

13. The method of claim 11, wherein the one or more sensor values selected from among the plurality of sensor values correspond to a load-critical area of the component, the component comprising the load critical area and at least one load-noncritical area.

14. The method of claim 13, wherein the one or more sensor values selected from among the plurality of sensor values comprise a plurality of sensor values clustered in close proximity to one another and corresponding to the load-critical area of the component, and wherein the investigation location corresponds to a plurality of sensor values.

15. The method of claim 11, comprising:
classifying at least some of the plurality of sensor values as being a critical sensor value based at least in part on (i) the respective sensor value being indicative of a structural fault, a temperature deviation when sintering or fusing a powdered construction material, and/or an imperfection in a coating of powdered construction material to be sintered or fused; and/or (ii) the respective sensor value corresponding to a load-critical area of the component.

16. The method of claim 15, comprising:
determining a degree of fracture risk associated with the at least some of the plurality of sensor values, the risk of fracture determined based at least in part on a degree of clustering among the at least some of the plurality of sensor values having been classified as a critical sensor value.

17. The method of claim 16, wherein the degree of fracture risk depends at least in part on the degree of clustering in proximity to a potential yield line.

18. The method of claim 17, comprising:
classifying the degree of fracture risk in relation to a fracture risk scale, the fracture risk scale based at least in part on the quantity of critical sensor values and/or the respective distance of the critical sensor values from a potential yield line.

19. The method of claim 18, comprising:
classifying the degree of fracture risk in relation to a fracture risk scale for a plurality of locations of the component; and
selecting the investigation location based at least in part on the degree of fracture risk, the investigation location corresponding to a location, selected from among the plurality of locations, having a relatively greater degree of fracture risk.

* * * * *